US009025601B2

(12) United States Patent
Ashwood-Smith (10) Patent No.: US 9,025,601 B2
(45) Date of Patent: May 5, 2015

(54) FORWARDING ASIC GENERAL EGRESS MULTICAST FILTER METHOD

(71) Applicant: Futurewei Technologies, Co., Plano, TX (US)

(72) Inventor: Peter Ashwood-Smith, Gatineau (CA)

(73) Assignee: Futurewei Technologies, Inc., Plano, TX (US)

( * ) Notice: Subject to any disclaimer, the term of this patent is extended or adjusted under 35 U.S.C. 154(b) by 238 days.

(21) Appl. No.: 13/660,603

(22) Filed: Oct. 25, 2012

(65) Prior Publication Data

US 2013/0107883 A1 May 2, 2013

Related U.S. Application Data

(60) Provisional application No. 61/552,213, filed on Oct. 27, 2011.

(51) Int. Cl.
*H04L 12/28* (2006.01)
*H04L 12/761* (2013.01)
*H04L 12/741* (2013.01)

(52) U.S. Cl.
CPC .............. *H04L 45/16* (2013.01); *H04L 45/745* (2013.01)

(58) Field of Classification Search
CPC ........................................................ H04L 45/16
USPC .................................................. 370/390, 474
See application file for complete search history.

(56) References Cited

U.S. PATENT DOCUMENTS

| 7,986,629 B1* | 7/2011 | Ferguson et al. ............. 370/235 |
| 2007/0248082 A1* | 10/2007 | Nielsen ......................... 370/360 |
| 2012/0136944 A1* | 5/2012 | Stewart et al. ................ 709/206 |

* cited by examiner

*Primary Examiner* — Gary Mui
(74) *Attorney, Agent, or Firm* — Conley Rose, P.C.; Grant Rodolph; William H. Dietrich (57) ABSTRACT

A method for adjusting the egress logical ports within a set of egress logical ports, the method comprising associating a plurality of operand values with a plurality of ingress logical ports and a plurality of egress logical ports, receiving a frame on one of the ingress logical ports, determining a proposed set of the egress logical ports to which to forward the frame, selecting an operator using content within the frame, performing a comparison operation comprising a first operand value, a second operand value, and the operator, modifying the proposed set of egress ports using the comparison operation, and transmitting the frame on the modified set of egress logical ports.

20 Claims, 5 Drawing Sheets

FORWARDING ASIC GENERAL EGRESS MULTICAST FILTER METHOD

CROSS-REFERENCE TO RELATED APPLICATIONS

The present application claims priority to U.S. Provisional Patent Application No. 61/552,213 filed Oct. 27, 2011 by Peter Ashwood-Smith and entitled "Forwarding Application-Specific Integrated Circuit General Egress Multicast Filter Method, System, and Apparatus," which is incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks comprise nodes, such as routers, switches, and/or bridges that transport data through the network. The routing functions within a node may be managed by specialized application-specific integrated circuits (ASIC) and other customized hard-coded logic components. ASICs and other customized hard-coded logic components may increase routing performance using dedicated logic to perform routing functions. For instance, the dedicated logic may perform routing functions in a parallel fashion that may require serial processing when implemented using software. Unfortunately, ASICs and other customized hard-coded logic components have a limited repertoire of functionality, and thus lack component flexibility.

General-purpose network processors may provide a more flexible design than ASIC and other customized hard-coded logic components. General-purpose network processors improve flexibility be utilizing encoded software to implement routing functions. New features, services, and protocols may be added to the general-purpose network processor with software-only changes. Although general-purpose network processors improve flexibility, the general-purpose network processors are often less efficient, more expensive, and consume more power than ASICs and other hard-coded components. Thus, in many instances, nodes that deploy ASIC or other hard-coded components may be the design preference for nodes processing data packets.

When routing packets, a node may look up the destination address of an incoming data packet to retrieve the routing information. Nodes may employ an egress physical port bitmap that uses bits to represent the physical ports of a node. For example, a node may use a 64 element bitmap to represent 64 different physical ports. To improve routing capacity and efficiency, a node that comprises an ASIC or other customized hard-coded logic component may utilize an auxiliary lookup mechanism to manage a set of egress physical ports that receive the outgoing data packets. Implementation of the auxiliary lookup mechanism may provide more flexibility during the routing process. For example, the auxiliary lookup mechanism may completely overwrite an existing egress physical port bitmap with a new egress physical port bitmap to designate a new set of egress physical ports. An auxiliary lookup mechanism may also mask the set of egress physical ports or increase the number of egress physical ports in the set. However, impractical bitmap sizes and hardware inflexibility impede applying an auxiliary lookup mechanism at the logical port or per virtual local area network (VLAN) level. A design alternative may be to use network processors to apply the auxiliary lookup mechanism at the logical port or VLAN level using encoded software. Nonetheless, as discussed earlier, use of general-purpose network processors may not only decrease performance, but increase cost and power consumption. Thus, other innovative solutions are necessary to manage the routing process for nodes that comprise ASICs or other customized hard-coded logic components.

SUMMARY

In one example embodiment, the disclosure includes a method for adjusting the egress logical ports within a set of egress logical ports, the method comprising associating a plurality of operand values with a plurality of ingress logical ports and a plurality of egress logical ports, receiving a frame on one of the ingress logical ports, determining a proposed set of the egress logical ports to which to forward the frame, selecting an operator using content within the frame, performing a comparison operation comprising a first operand value, a second operand value, and the operator, modifying the proposed set of egress ports using the comparison operation, and transmitting the frame on the modified set of egress logical ports.

In yet another example embodiment, the disclosure includes a plurality of ingress physical ports each comprising at least one ingress logical port, wherein the ingress physical port is configured to receive a frame, a plurality of egress physical ports each comprising at least one egress logical port, wherein the egress physical port is configured to transmit a frame, an apparatus for filtering egress logical ports comprising an ASIC coupled to the ingress physical ports and the egress physical ports, wherein the ASIC is configured to perform a first lookup using a first set of data in the frame to determine an egress logical port associated with a first set of bits, match a second set of data in the frame to a plurality of operation values, wherein more than one of the operation values match the second set of data in the frame, select a first operation value from the plurality of operation values that match the second set of data in the frame, perform a Boolean operation using the first operation value to return a result value, and prevent forwarding of the frame to any egress logical port when the result value for the egress logical port indicates a frame discard instruction.

In yet another example embodiment, the disclosure includes a network node for filtering egress logical ports during a multicast transmission, wherein the network node comprises an ingress logical port configured to receive an incoming multicast packet, wherein the incoming multicast packet comprises a header, a payload and a specified data segment value located in either header or the payload, an ASIC comprising a hardware search engine component wherein the ASIC device is coupled to the ingress logical port, and a plurality of egress logical ports coupled to the ASIC, wherein the ASIC is configured to associate the ingress logical port and the plurality of egress logical ports with a plurality of operand values, perform a first lookup against the header to select the set of egress logical ports, wherein the set of egress logical ports is a subset of the plurality of egress logical ports, obtain the first specified data segment value from the multicast packet, divide a first specified data segment value from the multicast packet into a second specified data segment value and a third specified data segment value, wherein the second specified data segment value and the third specified data segment values are subsets of the first specified data segment value, perform a second lookup against the second specified data segment value in the multicast packet using the hardware search engine to obtain a first operation value, perform a third lookup against the third specified data segment value in the multicast packet using the hardware search engine to obtain a second operation value, obtain a designated operation value, and determine whether to discard the multicast packet for the set of egress multicast packet by performing a Boolean operation comprising the first operation value, the second operation value, and the designated operation value.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are a method, apparatus, and system to manage and adjust the set of egress logical ports selected for outgoing data packets. During the routing process, a node may forward an incoming packet from an ingress logical port to a proposed set of egress logical ports. The proposed set of egress logical ports may be initially selected using header information received by the incoming packet and the routing information obtained from routing tables. In conjunction with the initial routing process, an auxiliary lookup mechanism may be used to modify the proposed set of egress logical ports without redefining the egress physical port bitmaps. The auxiliary lookup mechanism may apply a rule using Boolean logic operations such as "A OPERATION B" that modifies or filters the proposed set of egress logical ports. The "A" value may represent an ingress logical port value, while the "B" value may represent a proposed egress logical port value. The "OPERATION" value may include, but are not limited to a number of different Boolean comparison operations. A node may obtain the "OPERATION" value using a lookup process based on a specified data segment within the incoming data packet. Accordingly, the auxiliary lookup mechanism may filter out the proposed egress logical port "B" based on the result of the comparison operation of "A" against "B," and allow the packet to be transmitted on the remaining egress logical ports within the proposed set.

Figure 1:
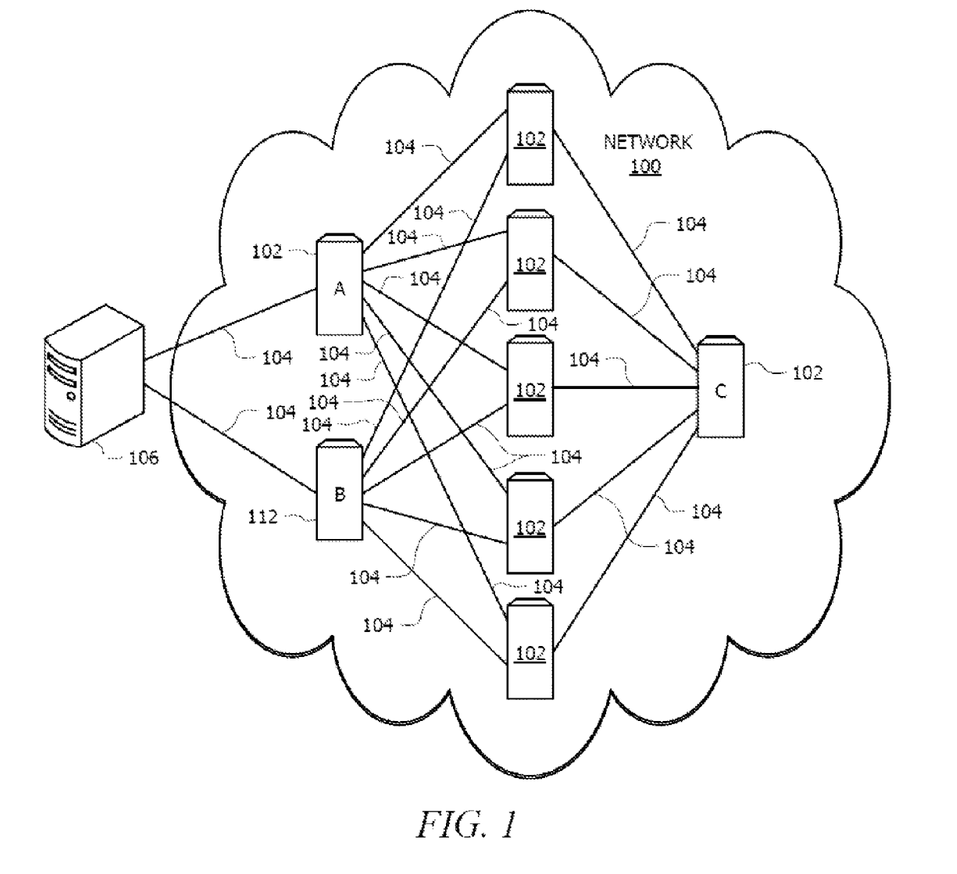
FIG. 1 is a schematic diagram of an embodiment of a network that comprises nodes with an auxiliary lookup mechanism for logical ports.

FIG. 1 is a schematic diagram of an embodiment of a network 100 that comprises nodes 102 that may use an auxiliary lookup mechanism for logical ports. Network 100 may be any network that provides multicast transmission, such as Internet Protocol (IP) networks, Multiprotocol Label Switching (MPLS) networks, Ethernet networks, etc. Network 100 may be a network comprising one or more local area networks (LANs), virtual networks, and/or wide area networks (WANs). Network 100 may be a network that operates in the electrical, optical, or a combination of both domains. Network 100 may offer data services that forward data from one node 102 to another node 102 without using pre-configured routes. Another example embodiment of network 100 may forward data from one node 102 to another node 102 across the network along pre-configured or pre-established paths.

Nodes 102 may include routers, switches, bridges, electrical-optical devices or various combinations thereof that are capable of transporting data packets through network 100. Nodes 102 may comprise a plurality of ports that may be physical ports and/or logical ports. The ports between nodes 102 may be coupled directly with links 104, such as fiber optic links, electrical links, and wireless links, or indirectly, using a logical connection or physical links with intervening nodes 102. Links 104 may comprise a single link, a series of parallel links, a plurality of interconnected nodes 102, or various combinations thereof used to transport data within network 100.

As shown in FIG. 1, Node A 102 and node B 102 may be coupled to a host 106. The host 106 may include hosts, servers, storage devices or other types of end devices that may originate data into or receive data from network 100. The host 106 may comprise a dual homed network interface controller with one port coupled to node A 102 and another port coupled to node B 102. In one example embodiment, nodes A and B 102 may receive a multicast packet from a node 102 (e.g. node C 102) within network 100. Nodes A and B 102 may be programmed to forward the multicast packet to all proper next-hop nodes 102. Nodes A and B 102 may internally forward the incoming multicast packet from an ingress port to a set of egress ports based on routing information obtained from the incoming multicast packet and routing tables. Nodes A and B 102 may also be programmed to use an auxiliary lookup mechanism such that node A 102 may forward multicast packets with an even source address toward host 106, and node B 102 may forward multicast packets with odd source address packets to host 106. The auxiliary lookup mechanism may modify the proposed set of egress ports that have already been selected by the multicast forwarding logic. The auxiliary lookup mechanism will be discussed in further detail below. Other example embodiments of nodes A and B 102 may apply the auxiliary lookup mechanism to filter the multicast transmission to other nodes 102, and may employ filtering mechanisms other than even and odd source addresses. Persons of ordinary skill in the art are aware that the auxiliary lookup mechanism may also be applied to any other types of data transmission, such as unicast or broadcast transmissions.

Figure 2:
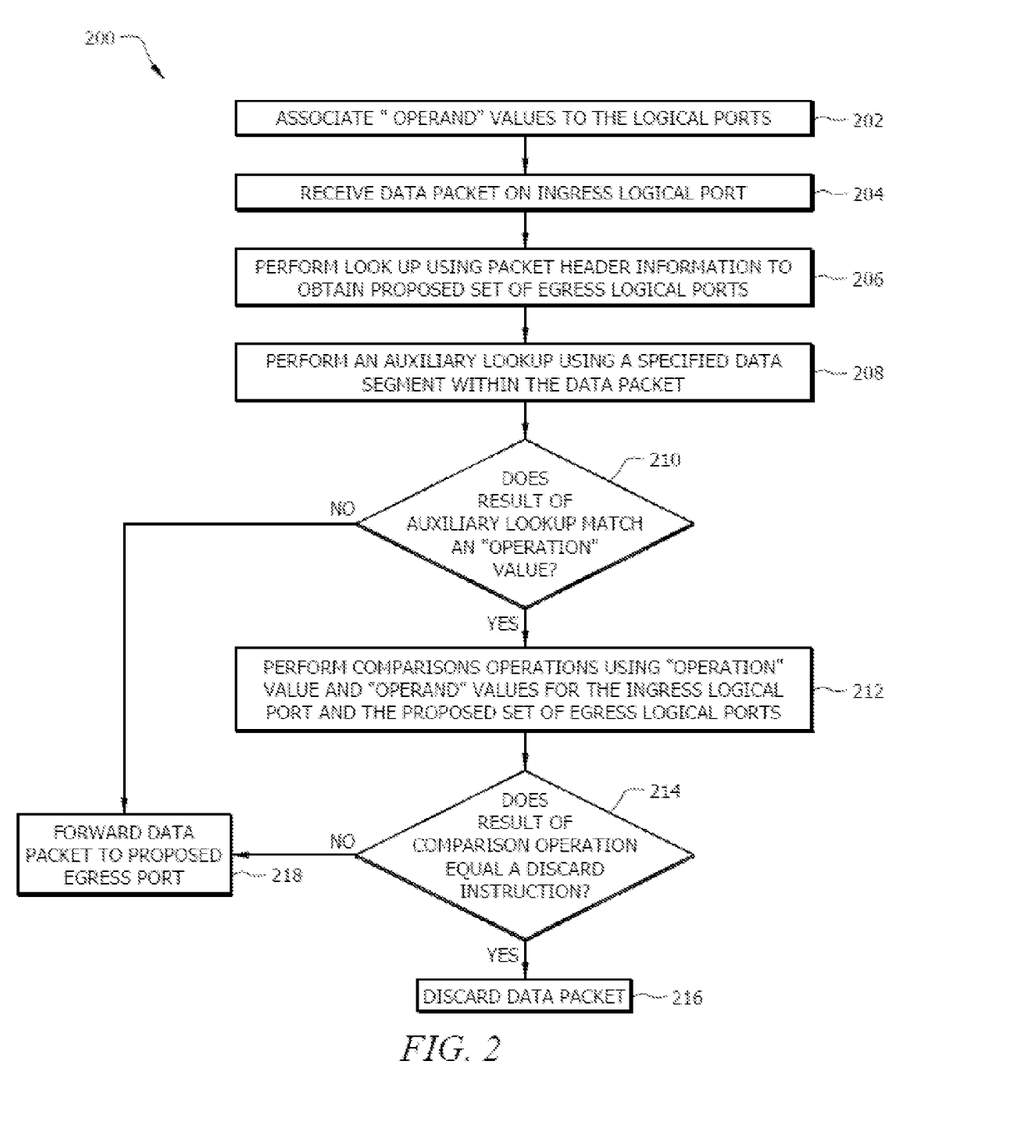
FIG. 2 is a flowchart of an embodiment of a method that performs auxiliary lookup mechanism against egress logical ports.

FIG. 2 is a flowchart of an embodiment of a method 200 that performs an auxiliary lookup mechanism against egress logical ports. Method 200 may start at block 202, where "OPERAND" values are associated with logical ports of a node. "OPERAND" values may be a sequence of bits (e.g. "11001111") for each ingress and egress logical port within a node. The "OPERAND" values may be unique values for each logical port, and may be obtained from a port address or assigned by an administrator. For example, one logical port may be assigned a bit value of "10000," while another logical port may be assigned a bit value of "10001." The "OPERAND" values from some of the logical ports may be used to perform comparison operations, which will be discussed in more detail at block 212.

After assigning "OPERAND" values from the logical ports of a node, method 200 continues to block 204. At block 204, a node may receive an incoming data packet on an ingress logical port. The incoming packet may be a multicast, unicast, broadcast, or any other similar type of packet. Once the ingress logical port receives the incoming packet, method 200 may proceed to block 206 and performs a lookup and/or decodes information in the header to retrieve the necessary routing information for the data packet. The header information used to obtain the routing information may include the packet's destination address and label. The routing information may include the proposed set of egress logical ports to which the data packet may be forwarded. For example, block 206 may use the destination address in a multicast packet to lookup routing information in a routing information base (RIB) or a forwarding information base (FIB) table. Routing information within the RIB or FIB table may include the multicast packet's proposed set of egress logical ports.

From block 206, the method 200 proceeds to block 208 and performs an auxiliary lookup against a specified data segment within the incoming data packet. The specified data segment may be any sequence of bits within the incoming data packet. The specified data segment may be located in the header, payload, and/or any other section of the incoming data packet. The specified data segment may be a different sequence of bits than is used in block 204 to determine the routing information. The auxiliary lookup uses the specified data segment to determine whether the sequence of bits references an "OPERATION" value stored within the node. For example, a node may associate a data value of "101111" with an "OPERATION" value of "=" (i.e. equal to). In such a case, whenever a specified data segment equals "101111," the auxiliary lookup may determine the specified data segment is assigned with the "OPERATION" value of "=." Examples of other "OPERATION" values may include: ">" (i.e. greater than), "<" (i.e. less than), "subset," "superset," "!=" (i.e. not equal to), "!<" (i.e. not less than), "!>" (i.e. not greater than), "&" (i.e. AND), "|" (i.e. OR), "^" (i.e. XOR), !subset (i.e. not subset), "!superset" (i.e. not superset), and any other Boolean operators that are well known in the art.

Once method 200 performs the auxiliary lookup, method 200 continues to block 210. At block 210, method 200 determines whether the specified data segment references a stored "OPERATION" value. For example, a specified data segment may have a data value of "000001," which does not reference an "OPERATION" value. In other words, data value "000001" does not point or correspond to a stored "OPERATION" value within a node. In this instance, the auxiliary lookup will not return an "OPERATION" value for data value "000001." When the result of the auxiliary lookup does not return a stored "OPERATION" value, then method 200 moves to block 212. However, when the result of the auxiliary lookup returns an "OPERATION" value, method 210 progresses to block 218.

When the auxiliary lookup returns a stored "OPERATION" value, the method 200 may use the "OPERATION" value obtained in block 208 to perform a comparison operation at block 212. The comparison operation may compare a pair of "OPERANDS" value using the "OPERATION" value. One "OPERAND" value may indicate the ingress logical port that received the incoming packet and the other "OPERAND" value may indicate one of the proposed egress logical ports. The two "OPERAND" values may be compared using the selected "OPERATION" value to produce a result value (e.g. true or false).

The comparison operation may be a Boolean function or Boolean operation that compares the two "OPERAND" values. For example, if block 208 returned an "OPERATION" value of "=," then the comparison operation may compare the "OPERAND" value of the ingress logical port and the "OPERAND" value for each egress logical port in the set of proposed egress logical ports. In such a case, when the "OPERAND" values for the ingress logical port and egress logical port are not equal, the comparison operation may return a result value of false or "0." Conversely, when the "OPERAND" values are equal, the comparison operation may return a result value of true or "1." Thus, the "OPERAND" values may be binary. Other embodiments may perform a binary operation, such performing an "AND" between two "OPERAND" values. Hence, the result value produced by the comparison operation may be a binary (e.g. "11001111") or logic value (e.g. True/False). At block 212, all proposed egress logical ports may be compared with the OPERAND value that indicates the ingress logical port using the "OPERATION" value, and the comparison process for each of the egress logical ports may be performed subsequently or in parallel.

After returning the result, the method 200 may advance to block 214. The resulting values from block 212 may then be used to determine whether to filter out each of the proposed egress logic ports as an output port. When the result equals a discard instruction, the method continues to block 216 and discards the incoming packet for the proposed egress logic port, and thus filters out the egress logic port. When the result does not equal a discard instruction, method 200 may proceed to block 218 and forwards the incoming data packet to the proposed egress logical port.

Figure 3:
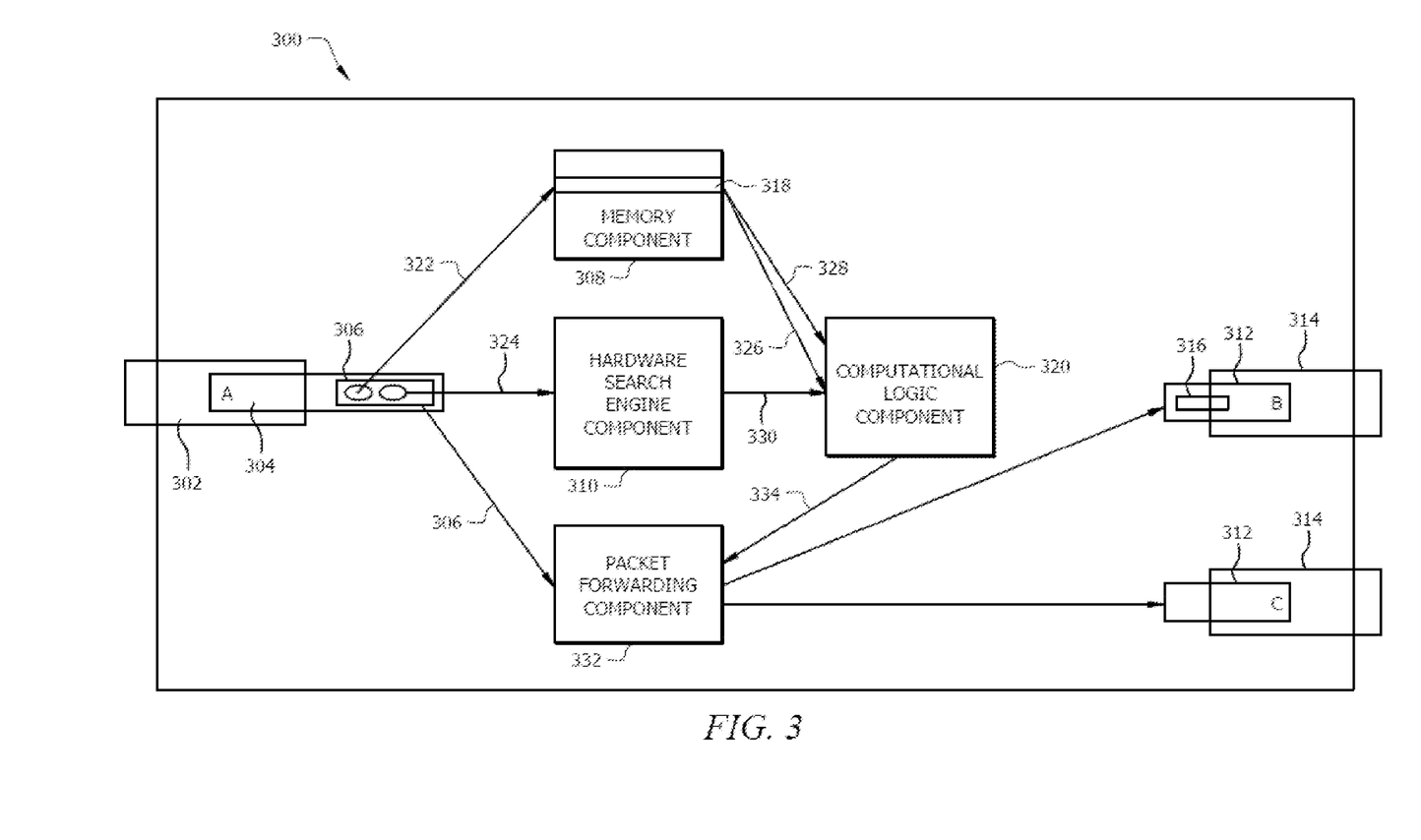
FIG. 3 is a schematic diagram of an embodiment of a node coded with the auxiliary lookup mechanism for logical ports.

FIG. 3 is a schematic diagram of an embodiment of a node 300 coded with the auxiliary lookup mechanism for logical ports. Node 300 may comprise ingress physical ports 302, ingress logical ports 304, a memory component 308, a hardware search engine component 310, computational logic component 320, packet forwarding component 332, egress logical ports 312, and egress physical ports 314. Node 300 may receive an incoming data packet 306 on an ingress physical port 302, which may be associated with an ingress logical port 304. There may be a plurality of ingress physical ports 302, and each ingress physical port 302 may be assigned with one or a plurality of ingress logical ports 304. The ingress logical port 304 may correspond to a particular service instance, such as a VLAN or Ethernet-Local Area Network (E-LAN) service. The incoming data packet 306 may be forwarded to one or more egress logical ports 312, for example as part of a multicast transmission. Each egress logical port 312 may be associated with an egress physical port 314. There may be a plurality of egress physical ports 314 and each egress physical port may be associated with a plurality of egress logical ports 312. Node 300 may output data packets 316 to adjacent nodes using the egress physical port 314. In FIG. 3, each egress logical ports B and C 312 are associated with only one egress physical port 314. However, another embodiment may have one or more ingress physical port 302 associated with about 4096 ingress logical ports 304, and one or more egress physical port 314 associated with about 4096 egress logical ports 312.

Recall that, the "OPERAND" value may be a sequence of bits, and that each logical port 304, 312 for node 300 may be associated with different "OPERAND" values (e.g. as described in block 202 of FIG. 2). Using FIG. 3 as an example, the ingress logical port A 304 may be associated with an "OPERAND" value of "100000000000," while egress logical port B 312 and egress logical port C 312 may have an "OPERAND" value of "100000000001" and "100000000010," respectively. Although the above example illustrates an "OPERAND" value about 12 bits long, other embodiments may have "OPERAND" values more than about 12 bits long or less than about 12 bits long.

An incoming data packet 306 may be received at an ingress logical port 304 (e.g. as described in block 204 of FIG. 2), and may comprises header information 322 used to route the data packet 306 in the network generally and within node 300 specifically. In one example embodiment, the incoming data packet 306 may be any Open Systems Interconnection (OSI) layer 2 or layer 3 encoded data packet, such as an Ethernet frame or an IP packet. The header information 322 may comprise a sequence of bits, which are encoded using a variety of protocols, such as MPLS, Asynchronous Transfer Mode (ATM), Ethernet, Internet Protocol version 4 (IPv4), Internet Protocol version 6 (IPv6), etc. The header information 322 may include a destination address encoded in an Ethernet frame, MPLS frame, IP packet, or other similar types of data signals. The header information 322 may include a label used in various protocols, such as a label in multi-protocol label switching (MPLS) or data link connection identifier label (DLCI) in frame relay protocols.

As shown in FIG. 3, header information 322 is sent to the memory component 308. The memory component 308 may use the header information 322 (e.g. destination address) to obtain the routing information by performing a lookup function. The lookup process may retrieve a table with routing information that can be used to forward the data packet 306 to one or more egress logical ports 312. The table may be a routing table, such as a RIB, or a forwarding table, such as a FIB stored within the memory component 308. An alternative example embodiment may use a table in a management plane or a management system stored in another node. The table may comprise an entry 318 that matches the destination address and/or other header information used during the lookup process. The table may store the "OPERAND" values for the ingress and egress logical ports. Entry 318 may provide the ingress "OPERAND" value 326 that indicates the ingress logical port 304, which receives data packet 306 and the egress "OPERAND" value 328 that indicates a proposed egress logical port 312 or a proposed set of egress logical ports 312 (e.g. in the case of a multicast transmission) provided by entry 318. The "OPERAND" values for the ingress and egress logical ports may be sent to the computational logic component 320.

The incoming data packet 306 may also comprise a specified data segment 324, which may be a sequence of bits located in the header or payload of data packet 306. As shown in FIG. 3, the specified data segment 324 may be forwarded to the hardware search engine component 310, which performs the auxiliary lookup described herein. The hardware search engine component 310 may include a content-addressable memory (CAM), ternary CAM, an access control list (ACL), and/or other hardware components capable of performing searching routines, distinguish bit patterns, and storing data information. As discussed, in conjunction with block 208 in FIG. 2, the auxiliary lookup determines whether the specified data segment 324 points to or references a stored "OPERATION" value within the hardware search engine component 310. The hardware search engine component 310 may comprise a table with a plurality of table entries. A table entry may comprise a sequence of bits that corresponds to an "OPERATION" value. The hardware search engine component 310 may attempt to match the specified data segment 324 with the sequence of bits in one of the table entries. When a table entry matches the specified data segment 324, the "OPERATION" value 330 may be sent to the computational logic component 320. The hardware search engine component 310 may perform the table lookup in parallel with the memory component 308 lookup up the routing information.

The computational logic component 320 may receive the ingress "OPERAND" value 326 and the proposed set of egress "OPERAND" values 328 from the memory component 308 as well as the "OPERATION" value 330 from the hardware search engine component 310. The computational logic component 320 may then use the "OPERATION" value 330 to perform separate comparison operations between the ingress "OPERAND" value 326 and each of the egress "OPERAND" values 328 (e.g. as described in block 212 of FIG. 2). The computational logic component 320 may perform multiple comparison operations for different proposed egress logical port 312 in parallel. Using FIG. 3 as an example, the computational logic component 320 may perform the comparison operation for the egress logical ports B 312 and egress logical port C 312 at the same time. In such an example, if A's "OPERAND" value (e.g. 326) is "1000", B's "OPERAND" value (e.g. 328) is "0001," C's "OPERAND" value (e.g. 328) is "1010," and the OPERATION value (e.g. 330) is "<," then "A <B" may return a logic value of "true" or "1," while "A<C" may return a logic value of false or "0." These result values 334 may be sent to the packet forwarding component 332. Other embodiments of the computational logic component 320 may combine "OPERATION" values for two given "OPERAND" values to produce the result values 334. For example, the computational logic component 320 may employ a comparison operation of "((A<B) AND (A OR B))" for the ingress logical port A 304 and the egress logical port B 312.

In one embodiment, the computational logic component 320 may be configured to implement a prioritization scheme for selecting "OPERATION" values. A specified data segment 324 in an incoming data packet 306 may match two or more "OPERATION" values 330. In some instances, the "OPERATION" values 330 may return different results. For example, the hardware search engine component 310 may match the specified data segment 324 with two "OPERATION" values 330, such as "<" and ">." When the computational logic component 320 performs the operation "A<B," the result may be to discard the frame. However, when computational logic component 320 performs the operation "A>B," the result may be to forward the frame. To determine which "OPERATION" value to use, "OPERATION" values may be assigned different priorities using a priority field. The "OPERATION" value with the highest priority may be used to perform the comparison operation. Another embodiment may organize the entries within the hardware search engine component 310 as a sorted list. When multiple "OPERATION" values correspond to the specified data segment 324, the "OPERATION" value that appears first in the list may be the "OPERATION" value 330 sent to the computational logic component 320. Persons of ordinary skill the art are aware that other prioritization or selection algorithms may be used to select the "OPERATION" value used for performing an operation.

The packet 306 may be forward to the packet forwarding component 332, which determines which egress logical ports 312 will send the outgoing packet 316. Specifically, the packet forwarding component 332 may use the result values 334 to the determine whether the egress logical port B 312 and egress logical port C 312 will transmit an outgoing data packet 316. Egress logical ports 312 that produced a result value 334 of false or "0" may be associated with a discard instruction. Thus, the packet forwarding component 332 may send the outgoing packet 316 to egress logical ports 312 marked as true or "1," and may not send the outgoing packet 316 to the egress logical ports 312 marked as false or "0" (e.g. as described in blocks 214, 216, and 218 of FIG. 2). In the example provided above, outgoing packet 316 would be sent to egress logical port B 312, but not to egress logical port C 312.

Memory component 308, hardware search engine component 310, computational logic component 320, packet forwarding component 332, or various combinations thereof may be embedded into an ASIC component or other customized hard-coded logic component. In another example embodiment, the memory component 308, the hardware search engine component 310, the computational logic component 320, packet forwarding component 332, or various combinations thereof may be coupled to an ASIC component or other customized hard-coded logic component. One or more ASIC components or other customized hard-coded logic components may associate the ingress logical ports 304 and egress logical ports 312 to the "OPERAND" value. Persons of ordinary skill in the art are aware that other components, such as general-purpose processor chips and/or network processors may be used in replacement of ASIC or other customized hard-coded logic components.

Figure 4:
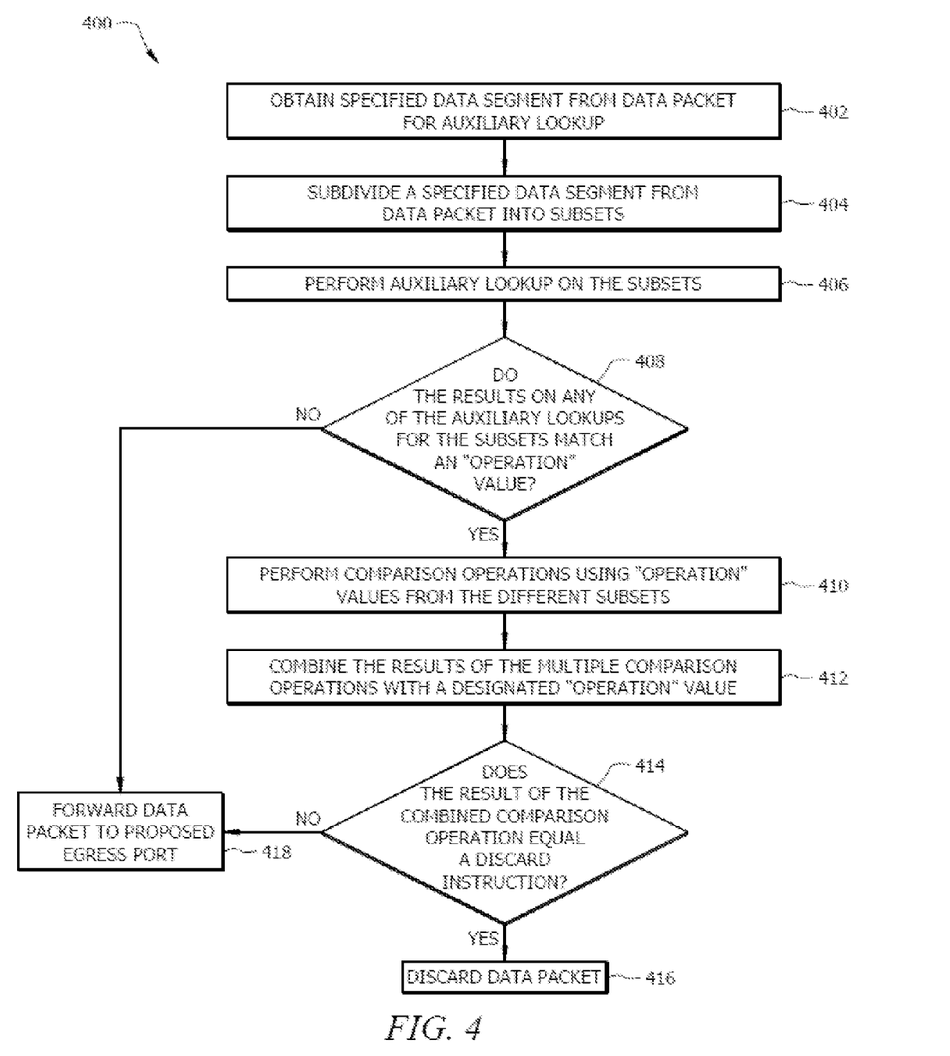
FIG. 4 is a flowchart of an embodiment of a method that performs multiple auxiliary lookups using a specified data segment from an incoming data packet.

FIG. 4 is a flowchart of an embodiment of a method 400 that performs multiple auxiliary lookups using a specified data segment from an incoming data packet. Method 400 implements comparison operations and provides more options in filtering egress logical ports using one specified data segment. Although not shown in FIG. 4, method 400 may associate the logical ports to "OPERAND" values, receive an incoming data packet on an incoming ingress logical port, and determine a proposed set of egress logical ports to forward the incoming data packet similar to method 200. At block 402, the specified data segment value may be obtained from the incoming data packet.

At block 404, method 400 may then divide the specified data segment value into subsets. For example, a specified data segment value of "000100100011" may be divided into three subsets based on the bit locations (i.e. $b_{11}$-$b_0$). The first subset may be "0001" (i.e. $b_{11}$-$b_8$); the second subset may be "0010" (i.e. $b_7$-$b_4$); and the last subset may be "0011" (i.e. $b_3$-$b_0$). Persons of ordinary skill in the art are aware of a variety of methods or algorithms to divide the specified data segment value into subsets. After dividing the specified data segment into subsets, the method 400 may proceed to block 406 and perform an auxiliary lookup for each subset. Using the previous example, an auxiliary lookup may be performed for "0001," "0010," and "0011." The auxiliary lookup may be as described in block 208. Method 400 may then continue to block 408 and determine whether any of the auxiliary lookups for each of the subset references an "OPERATION" value. The auxiliary lookups for each subset may be performed in parallel. Method 400 continues to block 418, similar to block 218 in FIG. 2, when none of the subset references an "OPERATION" value. However, if at least one of the subsets references an "OPERATION" value, then method 400 moves to block 410.

At block 410, a comparison operation similar to block 212 in FIG. 2 may be performed using the "OPERATION" values obtained for each subset. For example, the "0001" subset may have returned an "OPERATION" value of "<," the "0010" subset may have returned an "OPERATION" value of "!=" (i.e. not equal to), and the "0011" subset may have returned an "OPERATION" value of "subset." Block 410 may perform the following three comparison operations "A<B," "A!=B," and "A subset B." The "A" value may represent an ingress "OPERAND" value, while the "B" value may represent the proposed egress "OPERAND" value. Block 410 may return a result for each comparison operation. In one example embodiment, not all subsets may match an "OPERATION" value, and thus block 410 may perform less comparison operations than the number of subsets formed in block 404. Similar to block 212 from FIG. 2, Block 410 may perform comparison operations for all proposed egress logical ports and the ingress logical port, which received the incoming data packet, using the different "OPERATION" values.

After returning the results for each comparison operation, the method 400 may proceed to block 412 where each result may be combined to form a final comparison operation using a designated "OPERATION" value, such as an AND or OR operation. The "OPERATION" values may be pre-defined and/or obtained using the specified data segment value. Using the example above, the final operation may be "(A<B) AND (A!=B) AND (A subset B)." Block 412 will produce a result that may be a logic value or sequence of bits. Afterwards, method 400 continues to block 414 to determine whether the result equals a discard instruction, similar to block 214 of FIG. 2. When the result equals a discard instruction, the method continues to block 416 and discards the incoming packet for the proposed egress logic port, similar to block 216 in FIG. 2, and thus filters out the egress logic port. When the result does not equal a discard instruction, the method 400 may proceed to block 418 and forward the incoming packet to the proposed egress logical port.

Figure 5:
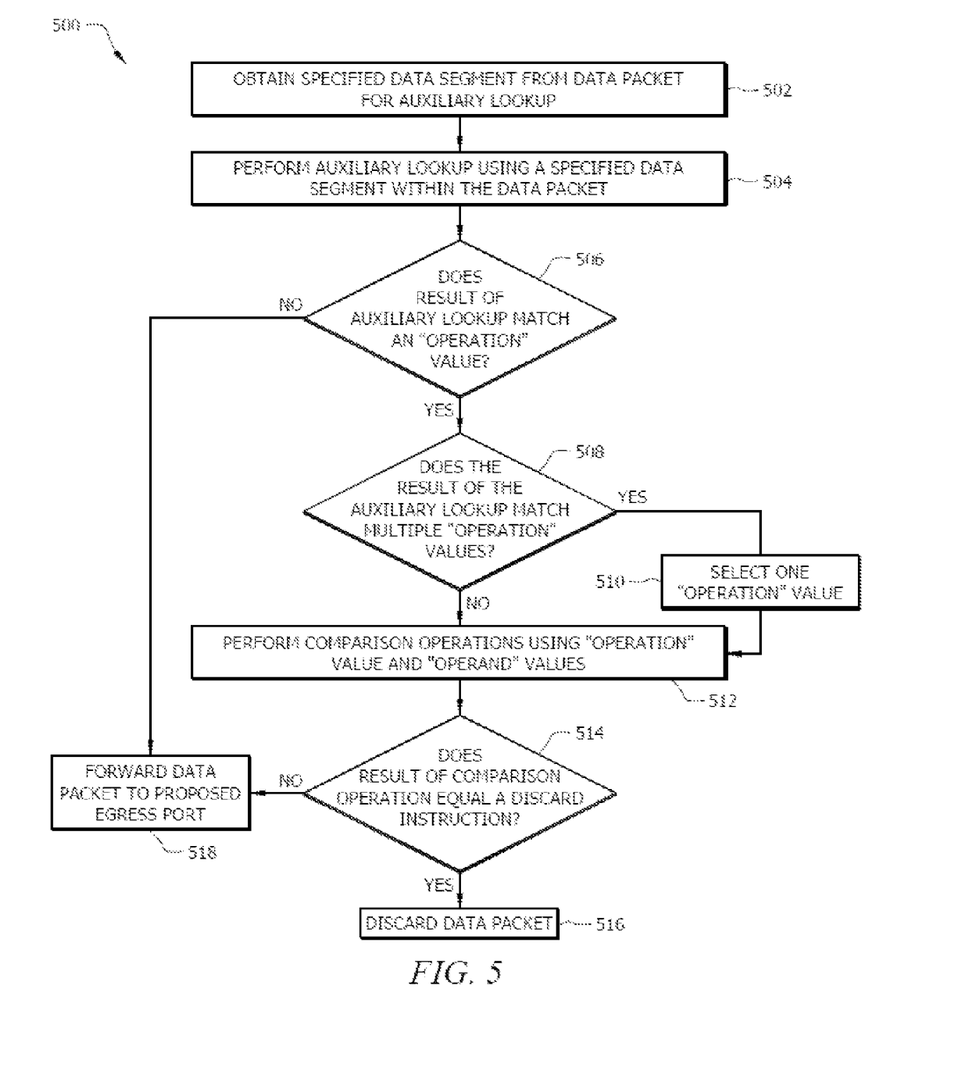
FIG. 5 is a flowchart of an embodiment of a method that selects an "OPERATION" value when multiple "OPERATION" values match a specified data segment value.

FIG. 5 is a flowchart of an embodiment of a method 500 that selects an "OPERATION" value when multiple "OPERATION" values match a specified data segment. Method 500 may be implemented when a node uses a wild-card address match to perform the auxiliary lookup. Although not shown in FIG. 5, method 500 may associate the logical ports to "OPERAND" values, receive an incoming data packet on an incoming ingress logical port, and determine a proposed set of egress logical ports to forward the incoming data packet similar to method 200. In addition, block 502 is similar to block 402 in FIG. 4, and blocks 504, 506, 512, 514, 516, and 518 are similar to blocks 208, 210, 212, 214, 216, and 218 from FIG. 2, respectively. At block 508, the method 500 determines whether the auxiliary lookup matches multiple "OPERATION" values. If one "OPERATION" value matches the specified data segment value, then method 500 continues to block 512. However, if more than one "OPERATION" value matches the specified data segment, the method 500 progresses to block 510.

Block 510 selects an "OPERATION" value. As discussed earlier, a specified data segment may be associated with more than one "OPERATION" value. Selection of the "OPERATION" value may be based on priority or order of appearance. For example, "OPERATION" values may be sorted in a list from high priority to low priority as follows: {"=," "<," ">," "subset," "superset," "!=," "!<," !>," !subset," and "!superset"}. The "=" and "!=" may be associated with a specified data segment value within the multicast frame. Block 510 may select the "=" "OPERATION" value because "=" appeared before "!=" on the list. Another example embodiment may associate different priorities to different "OPERATION" values. The priorities may be assigned using priority flags. Moreover, if the list was sorted by priority where the first to appear had the highest priority, then block 510 may also select the "=" "OPERATION" value.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

I claim:

1. A method for adjusting the egress logical ports within a set of egress logical ports, the method comprising:
    associating a plurality of operand values with a plurality of ingress logical ports and a plurality of egress logical ports;
    receiving a frame on one of the ingress logical ports;
    determining a proposed set of the egress logical ports to which to forward the frame;
    selecting an operator using content within the frame;
    performing a comparison operation comprising a first operand value, a second operand value, and the operator;
    modifying the proposed set of the egress logical ports using the comparison operation; and
    transmitting the frame on the modified set of egress logical ports.

2. The method of claim 1, wherein the proposed set of the egress logical ports are determined from the plurality of egress logical ports using a routing table and a subset of the frame's content, and wherein the frame is a multicast frame.

3. The method of claim 1, wherein determining the proposed set of the egress logical ports and selecting the operator are executed in parallel, and wherein the frame is blocked from any egress port that was in the proposed set of the egress logical ports and not in the modified set of the egress logical ports.

4. The method of claim 3, wherein determining the proposed set of the egress logical ports and selecting the operator are independent of each other.

5. The method of claim 1, wherein the first operand value indicates the ingress logical port which received the frame, and wherein the second operand value indicates only one of the egress logical ports in the proposed set of the egress logical ports.

6. The method of claim 1, wherein the proposed set of the egress logical ports is larger than the modified set of the egress logical ports.

7. The method of claim 1, wherein the first operand and the second operand are selected from a group consisting of the ingress logical port that received the frame and the proposed set of the egress logical ports, wherein the comparison operation produces a true indication or a false indication for each egress logical port in the set of proposed the egress logical ports.

8. The method of claim 7, wherein the operator is selected using a sequence of bits located in a payload section of the frame.

9. The method of claim 7, wherein the operator is one of a plurality of operators each having a specified priority, and wherein the selected operator has the highest priority.

10. The method of claim 1, wherein the first operand value and the second operand value are a sequence of bits, and wherein the first operand value is divided into a plurality of first subsets, and wherein the second operand value is divided into a plurality of second subsets.

11. A plurality of ingress physical ports each comprising at least one ingress logical port, wherein the ingress physical port is configured to receive a frame; a plurality of egress physical ports each comprising at least one egress logical port, wherein the egress physical port is configured to transmit a frame; and an apparatus for filtering egress logical ports comprising:

an application-specific integrated circuits (ASIC) coupled to the ingress physical ports and the egress physical ports, wherein the ASIC is configured to:

perform a first lookup using a first set of data in the frame to determine an egress logical port associated with a first set of bits;

match a second set of data in the frame to a plurality of operation values, wherein more than one of the operation values match the second set of data in the frame;

select a first operation value from the plurality of operation values that match the second set of data in the frame;

perform a Boolean operation using the first operation value to return a result value; and prevent forwarding of the frame to any egress logical port when the result value for the egress logical port indicates a frame discard instruction.

12. The apparatus of claim 11, wherein the ASIC is further configured to associate the ingress logical port to a first bit sequence and the egress logical port to a second bit sequence, and wherein the Boolean operation returns the result value using the first bit sequence and the second bit sequence.

13. The apparatus of claim 11, wherein the second data set comprises a first subset of data and a second subset of data, and wherein the ASIC is further configured to select the first operation value using the first subset of data and select a second operation value using the second subset of data.

14. The apparatus of claim 11, wherein the ASIC is further configured to select a first operation value based a prioritization rule, and wherein the first operation value has the highest priority.

15. The apparatus of claim 11, wherein the ASIC is further configured to perform the Boolean operation for each operation value that matches the second set of data in the frame, and wherein some of the results from the Boolean operation are different.

16. The apparatus of claim 11, wherein the ASIC is further configured to select a first operation value based on a listing order of the plurality of operation values, and wherein the first operation value appears first in the list.

17. A network node for filtering egress logical ports during a multicast transmission, wherein the network node comprises:

an ingress logical port configured to receive an incoming multicast packet, wherein the incoming multicast packet comprises a header, a payload and a specified data segment value located in either header or the payload;

an application-specific integrated circuit (ASIC) comprising a hardware search engine component wherein the ASIC is coupled to the ingress logical port; and a plurality of egress logical ports coupled to the ASIC, wherein the ASIC is configured to:

associate the ingress logical port and the plurality of egress logical ports with a plurality of operand values;

perform a first lookup against the header to select a set of egress logical ports, wherein the set of egress logical ports is a subset of the plurality of egress logical ports;

obtain a first specified data segment value from the multicast packet;

divide the first specified data segment value from the multicast packet into a second specified data segment value and a third specified data segment value, wherein the second specified data segment value and the third specified data segment values are subsets of the first specified data segment value;

perform a second lookup against the second specified data segment value in the multicast packet using the hardware search engine to obtain a first operation value;

perform a third lookup against the third specified data segment value in the multicast packet using the hardware search engine to obtain a second operation value;

obtain a designated operation value; and determine whether to discard the multicast packet for the set of egress logical ports by performing a Boolean operation comprising the first operation value, the second operation value, and the designated operation value.

18. The network node of claim 17, wherein a first data value represents the data value for the ingress logical port, wherein a second data value represents one of egress logical ports from the set of egress logical ports, wherein the Boolean operation further comprises the first data value and the second data value.

19. The network node of claim 18, wherein the Boolean operation performs a first comparative operation of the first data value and the second data value using the first operation value to compute a first result value, wherein the Boolean performs a second comparative operation of the first data value and the second data value using the second operation value to compute a second result value, and wherein the Boolean operation performs a third comparative operation for the first result value and the second result value using the designated operation value.

20. The network node of claim 17, wherein the ASIC further comprises a memory component coupled to a computational logic component, and a packet forwarding component coupled to the computational logic component, and wherein the hardware search engine component is coupled to the computational logic component.

* * * * *